TRANSISTOR BACK BIAS

Filed May 7, 1963

INVENTOR
John C. May

BY Claude Funkhouser ATTORNEY

James E. Sneed AGENT

United States Patent Office 3,296,540

Patented Jan. 3, 1967

3,296,540

TRANSISTOR BACK BIAS

John C. May, Ithaca, N.Y., assignor, by mesne assignments, to the United States of America as represented by the Secretary of the Navy Filed May 7, 1963, Ser. No. 278,792
1 Claim. (Cl. 330—3)

The present invention relates to a means for stabilizing the gain of vacuum taubes. More particularly, the present invention relates to a transistor back bias system for a vacuum tube to maintain constant current in the cathode circuit to thereby provide constant gain when the refer ence level of the tube has been changed.

The term "back bias" is used to indicate a degenerative type feedback to the cathode circuit of a vacuum tube amplifier.

An important part of most communication systems such as radio or radar is the intermediate frequency (IF) amplifier. The IF amplifier is usually a high gain device, particularly in radar applications and is intended in such applications to amplify pulses. The high gain and frequency response characteristics of the amplifier subjects it to noise such as that from natural or man-made interferences which will also be amplified along with the desired pulses. When the reference level of the amplifier is changed, i.e., by interference, the gain of the amplifier is also changed, making the amplification of the desired pulses subject to the intensity of the interference.

It has been shown that the pulse gain of an amplifier stage will remain constant even though the reference level of the tube is varied if the cathode current is kept constant. One existing technique for stabilizing the gain of amplifiers in the presence of interference is to provide a resistive means to back bias the cathode circuit. The resistive back bias technique utilizes a resistor in the return circuit of an amplifier to provide degenerative feedback and thus reduce the gain of the amplifier in accordance with the output signal. A voltage proportional to cathode current (and therefore insensitive of interference) is generated across the back bias resistor and serves to keep the reference level of the signals within predetermined limits. The difficulty with this prior art technique is that the gain stabilizing is limited by the ability of the amplifier tubes themselves to generate the protective "back bias."

Another technique for stabilizing, or varying, the gain of a vacuum tube amplifier has been that of using a separate vacuum tube to control the current in the return circuit of the amplifier. This technique is not practical in that the resulting circuits are unwieldy and tend to be unstable. It has been found that in vacuum tube regulator circuits it is necessary to sacrifice band-width in order to achieve the high gain desired and, consequently, the frequency of the interference which can be successfully neutralized is greatly limited.

Therefore, it is an object of the present invention to provide a means for maintaining constant pulse gain of an amplifier.

It is a further object of the present invention to provide a vacuum tube amplifier whose gain may be regulated by the presence of a current regulating device in the cathode circuit.

It is a further object of the present invention to provide a vacuum tube amplifier whose pulse gain is maintained at a constant value by maintaining a constant cathode current when the reference level of the tube is varied.

Another object of the present invention is to provide a constant gain amplifier whose cathode current is maintained constant by means of a transistor regulator in the cathode circuit.

Still another object of the present invention is to provide transistor back bias in the cathode circuit of a vacuum tube to maintain the pulse gain of the amplifier constant by keeping the cathode current constant when the reference level of the amplifier is varied.

A better understanding of the present invention may be obtained from the following figures and their accompanying description wherein.

Figure 1:
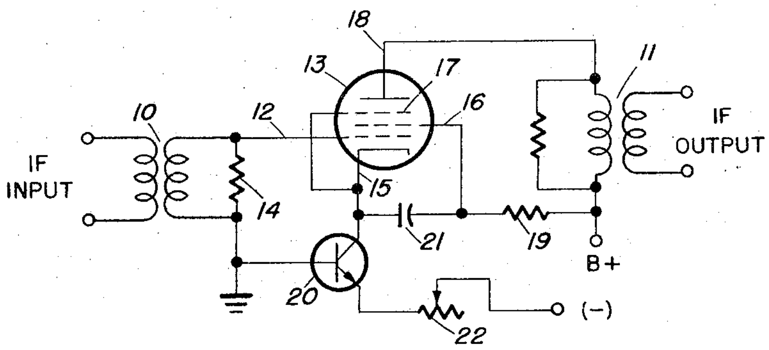
FIG. 1 is a circuit diagram of the present invention.

FIG. 1 shows a typical IF amplifier such as that used in a radar having an input transformer 10 and an output transformer 11. The input signal is coupled to the grid circuit 12 of tube 13, and a grid leak resistor 14 provides a D.C. path to ground. Vacuum tube 13 is a typical pentode having a grid 12, a cathode 15, a screen grid 16, a suppressor grid 17, and a plate 18. Suppressor grid 17 is connected to cathode 15. Screen grid 16 is biased from the amplifier B+ voltage through resistor 19 and is connected to the collector of transistor 20 through capacitor 21. The emitter current of transistor 20 is controlled by variable resistor 22 connected to a source of direct current.

Figure 2:
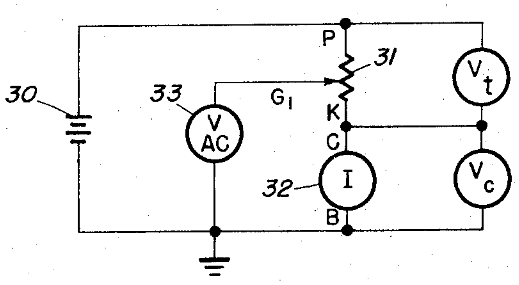
FIG. 2 is a schematic representation of the circuit shown in FIG. 1.

As can be seen in FIG. 1, transistor 20 is a common base transistor. FIG. 2 shows a schematic representation of the circuit shown in FIG. 1. A battery 30 represents the B+ voltage for the amplifier circuit. The resistance of the vacuum tube 13 between plate 18 and cathode 15 is represented by a resistor 31, and the constant current regulator transistor is represented by current source 32. The voltage drops across the vacuum tube 13 and the collector-base circuit of transistor 20 are represented as $V_t$ and $V_c$, respectively.

Constant current source 32 represents the collector-to-base circuit of the transistor. A voltage source 33 represents the A.C. voltage input to the grid of tube 13. It should be noted that this voltage has a variable tap on resistor 31 which indicates the effective variable resistance of the tube 13 when the grid bias is varied.

Figure 3:
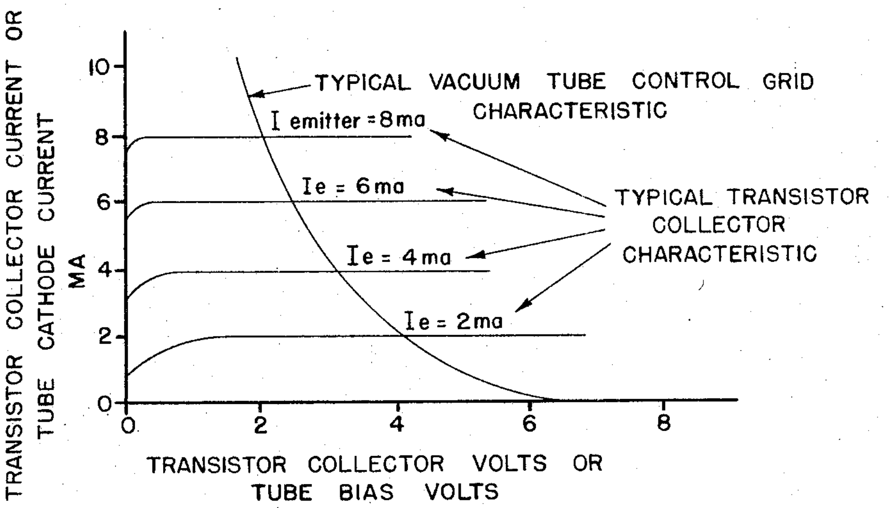
FIG. 3 is a diagram of the tube current vs. bias voltage, and collector current vs. collector voltage for the vacuum tube and transistor, respectively.

FIG. 3 indicates the variation in transistor-collector current with transistor-collector volts and also tube cathode current with tube bias volts. The operating point of the tube is determined by the intersection of the tube curve and one of the transistor characteristic curves. By varying the transistor emitter current, the tube operating point may be adjusted. With no A.C. signal applied to the grid circuit of the tube, the operating point is determined by the intersection of the tube and transistor characteristics.

Referring again to the schematic shown in FIG. 2, it can be seen that in a conventional tube circuit when a large A.C. signal is applied to the grid of the tube the D.C. component of cathode current will increase due to the nonlinear characteristics of the tube. This increase in direct current corresponds, or is equivalent to, a reduction in the magnitude of the plate to cathode resistance 31. The application of a large signal will not change the gain as such. The effect is to reduce the dynamic range of the tube during the time of the large signal and cause the incremental or pulse gain to be reduced. In FIG. 3, for example, if the no-signal operating point is 3 volts of cathode bias and a pulse of 2 volts peak-to-peak amplitude is applied, the current variation (which is not controlled by any back bias device) will be from 8.5 ma. to 2 ma.; a change of 6.5 ma. If, in addition to the pulse, some interference is present such that the cathode bias is now 5 volts, the current variation for the 2-volt pulse will be from 2 ma. to zero current; a change of only 2 ma.

It can be seen that the pulse gain is dependent upon the level of interference if no protective circuits are employed. The transistor back bias circuit controls only the D.C. component of tube current. Variations in the D.C. component which are caused by interference are smoothed to keep the incremental gain of the stage at an optimum level, but the high frequency currents caused by the pulse are outside the bandwidth of the transistor and are not subject to back bias action. Such a result in a radar circuit, for instance, would make amplification of the desired pulse subject to the intensity of the interferences.

However, in the device of the present invention a transistor back bias is provided in the return circuit of the amplifier so that constant current is maintained in the cathode circuit even when the grid voltage level of the tube is changed. In the transistor back bias circuit, a reduction in the effective cathode to plate resistance 31 occurs as in standard amplifier circuits when a large A.C. signal is applied to the grid. However, because of the constant current characteristics of the transistor, a reduction in the cathode to plate resistance 31 in the tube causes a shift in the relative magnitude of the voltages across the tube $V_t$ and the collector circuit of the transistor $V_c$, with $V_c$ increasing and $V_t$ decreasing. Since the grid of the tube 13 is at D.C. ground, the increase in cathode to ground voltage ($V_c$) is applied as a bias to the tube and a new operating point is assumed. The new operating point has a higher bias level than the initial level of the tube, but a constant direct current in the cathode circuit has been maintained.

The present invention provides a compact design of a vacuum tube amplifier having superior performance under interference conditions. It will be understood that various changes in the details, materials, steps and arrangement of the parts, which have been herein described and illustrated in order to explain the nature of the invention may be made by those skilled in the art, within the principle and scope of the invention, as expressed in the appended claim.

What is claimed is:

In a device for controlling the gain of an intermediate frequency amplifier to a constant level the combination comprising:

a vacuum tube amplifier having an input circuit and an output circuit;

said input circuit including a grid resistively coupled to direct current ground;

said output circuit including a plate circuit and a cathode circuit;

transistor means having base, emitter, and collector;

said collector being connected in series with said cathode of said vacuum tube;

said base directly coupled to ground; and said emitter being connected to a variable source of direct current whereby large alternating current signal inputs applied to the grid of the vacuum tube cause an increase in cathode to ground voltage which is applied as a bias voltage to the tube providing a new operating point for the tube but retaining the same direct current cathode current.

References Cited by the Examiner

UNITED STATES PATENTS

| | | | |
|---|---|---|---|
| 2,872,570 | 2/1959 | Dickinson. | |
| 2,897,429 | 7/1959 | Jochems. | |
| 3,134,078 | 5/1964 | Holmes | 330—3 |
| 3,163,827 | 12/1964 | Kandiah | 330—3 |

ROY LAKE, *Primary Examiner.*

N. KAUFMAN, *Assistant Examiner.*